United States Patent Office 3,097,194
Patented July 9, 1963

3,097,194
PROCESS FOR PREPARING PHOSPHORYLATED ELASTOMERIC COPOLYMERS OF ETHYLENE AND PROPYLENE
Edward C. Leonard, Jr., Plainfield, and William L. Wheelwright, North Plainfield, N.J., assignors to Union Carbide Corporation, a corporation of New York
No Drawing. Filed Jan. 21, 1960, Ser. No. 3,737
7 Claims. (Cl. 260—88.2)

This invention relates to an improved process for preparing elastomeric copolymers of ethylene and propylene. More particularly, this invention relates to a process for preparing highly phosphorylated amorphous copolymers or ethylene and propylene containing less than about one percent of low molecular weight polymeric oils, and at least about one percent phosphorus as phosphonyl dichloride groups in a basic one-step process which combines polymerization and the phosphorylation.

Copolymers of ethylene and propylene heretofore prepared by what is now commonly known as the Ziegler technique for the most part have been formed to contain a high percentage of low molecular weight polymeric oils. This oily component will, in most cases, range between about 5 and 15 percent by weight of the polymer, and gives the resulting copolymers a soft and sticky texture. Thus, the presence of this oil in addition to the high crystalline content of such copolymers significantly affects their elastic properties and seriously limits the usefulness of any of these copolymers as elastomers.

Other methods have been attempted to secure copolymeric products free of such oils which are no longer soft, tacky, poorly elastic materials but are instead solid, rubbery materials with good extensibility having none of the surface tackiness which characterized the products produced by the existing methods. While these elastomeric copolymers are highly useful per se, they are even more useful when phosphorylated and vulcanized with metal oxides. As such, they not only retained their toughness and high elasticity but had excellent heat and ozone resistance and good low temperature properties. They are also quite suitable for molding and extrusion applications.

Heretofore, it had been necessary to first prepare the copolymer by one process and then to phosphorylate it by another process. The copolymerization was carried out in an aromatic or aliphatic hydrocarbon or in a halogenated aromatic hydrocarbon. The second step, phosphorylation, was carried out on washed and dried copolymer which was dissolved either in pure PCl₃ or a mixture of PCl₃ and certain inert diluents. The entire process, then, consisted of (1) copolymerization, (2) work-up copolymer, (3) solution of copolymer in phosphorylation medium, (4) phosphorylation and (5) work-up of phosphorylated copolymer. The problem became, then, the development of a simple one-step process that combines copolymerization and phosphorylation which avoids all of the unnecessary handling steps and provides a commercially attractive process to secure the phosphorylated copolymer.

According to the present invention we have now discovered a process for the production of phosphorylated ethylene-propylene copolymers which includes the steps of contacting a mixture of ethylene and propylene monomers with a catalyst comprising a trialkyl aluminum compound and vanadium trichloride or the purple form of titanium trichloride which is suspended or dissolved in a substantially inert non-polar solvent until the desired amount of copolymer is formed and thereafter adding an amount of water to the reaction mass in an amount at least sufficient to react with substantially all the trialkyl aluminum and the vanadium or titanium trihalide present, contacting the thus-formed mixture with oxygen until substantially all of the aluminum and vanadium or titanium have been converted to the oxide and thereafter adding phosphorus trichloride to the said mixture while continuing the oxygen contact.

Thus, in this process, the entire reaction can be conducted in one vessel without need for expensive and elaborate equipment by following the additions schedule set forth above without need for polymer recovery, catalyst separation or other necessary steps heretofore believed necessary.

In the process of this invention, the catalyst must be employed in an inert non-polar solvent for the monomers in order to provide reactive contact of the ethylene and propylene with the catalyst and which is substantially inert to the phosphorylation reaction. Such inert solvents include aromatic hydrocarbons free of aliphatic substitution such as benzene, naphthylene and the like as well as halogenated non-polar hydrocarbons, such as chlorobenzene, dichlorobenzene, monochloronaphthalene and the like, and other inert solvents.

Preferably, the boiling points of the selected solvent should be above 110° C. so as to facilitate the fractional distillation of solvent and phosphorus halides if such are to be reused or recovered. However, such is not critical in the process and no discernible difference in the polymer, either before or after phosphorylation, is observed in using solvents boiling above or below 110° C.

We particularly prefer the solvent to be employed in amounts sufficient to keep the polymerization catalyst solids in the reaction medium at no higher than 10 to 15 percent by weight, although so little as one percent catalyst in the solvent can be used if desired. Most desirable results are secured when the total polymerization catalyst concentration at the beginning of the polymerization is about 20 millimoles of total weight of catalyst for each liter of solvent with the molar ratio of trialkyl aluminum compound to the titanium trichloride or vanadium trichloride being about three to one.

Generally, the molar amounts of 2 to 4 moles of the trialkyl aluminum compound per mole of titanium or vanadium trichloride provide the most desirable results. Good results are secured with molar ratios of 1:1 to as high as 10:1 of trialkyl aluminum compound per mole of titanium or vanadium trihalide.

It is essential in this process to secure the highly amorphous copolymer substantially free of these polymeric oils that the purple form of titanium trichloride be used. The preparation of this purple form is described by J. M. Sherfey in The Journal of Research of the National Bureau of Standards 46 No. 4, p. 299 (1951), which is herewith incorporated by reference. The other known form of titanium trichloride, the brown form, as is normally obtained from the reduction of a titanium tetrahalide with a reducing agent such as metallic sodium, aluminum alkyls, metal alkyls and the like, is not effective in providing the highly elastic amorphous copolymers substantially free of oil. Such catalyst systems result in a product generally having from 5 to 25 percent of polypropylene oils. This results in a sticky polymeric mass having little elasticity.

In the process of this invention, the ethylene and propylene can best be added at below the liquid level of the solvent-catalyst mixture through a suitable gas dispersing means for good reactive contact. The addition of an inert gas to the reactor to displace the air over the mixture is advantageous. The addition of ethylene and propylene can be in separate gas streams or in admixture as desired. Molar ratios of propylene to ethylene of from ½ to about 5, must be employed to prepare the amorphous copolymers of this invention. This can be regulated either by controlling the flow rates of individual reactant streams or adjusting the make-up of the mixture.

Polymerization temperatures in the range of about 40° C. to about 70° C. are preferred, although temperatures in the range 20° C. to 120° C. have been employed without difficulty and without need for superatmospheric pressure. If higher operation temperatures are desired, superatmospheric pressures can be employed. However, in such reactions, it is necessary that the reaction temperature be below the decomposition temperature of the copolymer. Some decompositions of the copolymeric resin can be expected at temperatures of 200° C. or higher, and thus are to be avoided. Temperatures can be conveniently controlled in the process either by the use of external or internal cooling means or by the controlled addition of ethylene and propylene, or both.

The rate of addition of the ethylene and propylene monomers to the catalyst mixture in the solvent is not critical. For control reasons, we prefer to add them at a rate such that about 10 percent by weight of polymeric solids is formed in the reaction mixture in from one to three hours, depending upon the reaction temperature selected.

With the control over the molar amounts of ethylene and propylene, the prepared copolymers will contain between about 35 percent to 80 percent propylene, and will be substantially free of low molecular weight polymeric oils and nearly completely amorphous. By the term "substantially free of low molecular weight polymeric oils," we mean those containing less than about one percent of oily material soluble in boiling acetone. The presence of such materials not only renders the product significantly sticky and tacky, but also impairs the strength of the elastomer and makes it quite soft. The presence of such oils can be detected by extracting the polymer with boiling acetone, which acts as a solvent for such oils and determining the weight content of the polymer of the extracted material.

At this point, the copolymer can be recovered from the reaction mixture if desired, generally by the addition of a non-solvent for the polymer, for instance, methanol, ethanol and higher alcohols, in amounts sufficient to cause the polymer to precipitate from the mixture. The copolymer can then be filtered off and washed free of catalyst residue and dried. However, since the object of this invention is to avoid this recovery and work up step, we prefer to go directly to the phosphorylation.

The crystalline content of the polymers prepared by the instant process is always of a lower magnitude, generally not exceeding about 15–20 percent, and most often is considerably lower or is totally absent as determined by infra-red spectrum analysis. It is truly surprising that this polymer can be made not only to have such a low oil content but also to have a lower crystalline content.

The molecular weight of these oil-free amorphous copolymers is generally quite high, as indicated by the low melt indices of the products. Melt indices of as low as 0.04 have been achieved although higher melt indices ranging up to about 1.0 are also easily prepared. More commonly, the melt index of these copolymers will range from about 0.1 to 0.7. All of these polymers exhibit elastomeric properties considerably different from the copolymers containing a substantial degree of crystalline content.

The phosphorylation of the copolymer is conducted in situ in the reaction mass by inactivating the polymerization catalyst with water and oxygen to convert the aluminum alkyls and vanadium or titanium trihalides to innocuous metal oxides which will not significantly affect the phosphorylation.

This is accomplished by adding an amount of water at least sufficient to react with all of the aluminum alkyl and vanadium or titanium trihalide present, to form the oxides or hydroxides, and is readily determined from the amount of catalyst known to be present in the reaction system. Preferably, an excess of the calculated amount of water needed should be used, generally in the order of 2 to 3 times the stoichiometric amount in order to make sure that all hydrolyzable components of the catalyst system become inactivated. However, excess water above 4–5 times the stoichiometric amount is somewhat detrimental, to the reaction system inasmuch as the excess water above this amount then begins to react with the phosphorus trichloride to form phosphorous acid which is an unreactive species in this invention.

After the addition of the water, oxygen is bubbled through the reaction mass, either through the same equipment and manner as the ethylene and propylene additions, or through separate inlet tubes as desired. Generally 5 to 10 minutes of oxygen contact is sufficient if there is adequate agitation and contact with the mixture to assure that the catalyst compounds are converted to the corresponding metal oxides. These compounds, in contrast to their precursors, do not interfere with the phosphorylation. The oxygen addition has no effect upon the formed polymer also in the solution so that rate of oxygen addition or time of contact is not critical as long as it is sufficient to oxidize substantially all of the components to their corresponding metal oxides.

While the oxygen addition can be terminated if desired until the phosphorus trichloride is added, we prefer to continue the addition while adding the phosphorus trichloride so that phosphorylation begins immediately. Phosphorylation, we have found, can be achieved only with phosphorus trichloride and oxygen-containing gas. Other phosphorus compounds, such as phosphorus oxychloride are not suitable in this process inasmuch as they do not react with the copolymer to introduce phosphoryl dichloride groups on the polymer.

In this system it is necessary only that the phosphorus trichloride be employed in an amount sufficient to introduce at least about 0.5 percent and preferably from 0.5 to about 2.0 percent phosphorus into the polymer, as phosphoryl dichloride groups. Preferably, a weight ratio of about two parts of copolymer per part of phosphorus trichloride is used though amounts as low as 0.5 part of phosphorus trichloride per part of copolymer in the reaction mass can be used. Excess amounts of the phosphorus trichloride can be used but serve no practical purpose.

The phosphorylation reaction is readily conducted without need of a catalyst at temperatures of from about 20° C. to about 75° C. However, temperature of reaction has very little or no effect upon reaction rate. If desired, however, catalysts can be employed to speed up the reaction. Such catalysts as free-radical initiating catalysts, such as azo compounds like bisazodiisobutyronitrile, or peroxide catalysts such as benzoyl peroxide and the like, as well as compounds such as benzaldehyde, metals such as nickel, vanadium, silver and manganese are effective. Likewise, monomeric olefins per se such as ethylene, propylene, butene-1, heptene-1, octene-1, and even polyethylene and polypropylene greases of low molecular weight can be used as catalysts. Actinic light has also been found to be an effective catalyst.

A correlation exists in the rate of reaction and the rate of evolution of hydrogen chloride from the mixture being phosphorylated. Thus, the reaction can be followed by titrating the evolved hydrogen chloride and calculating the amount of combined phosphorus (as phosphoryl dichloride groups). When the desired amount of phosphorus in the polymer is obtained, the flow of oxygen is stopped and the polymer hydrolyzed and recovered.

The flow rate of oxygen to the reaction mixture during phosphorylating is not narrowly critical. It has been found that the reaction rate increases with oxygen flow up to a maximum reaction rate but then tends to level off even with further increases in oxygen flow. For obvious reasons, it is desired to operate the process at the maximum oxygen addition flow rate and adjust the cooling capacity of the system to remove the exothermic heat of reaction.

While for the operation of this process it is not necessarily critical that the phosphorylation reaction be conducted to a minimum phosphorus content of 0.5 percent, the most dramatic changes of the copolymer take place at about 0.5 to 2.0 percent. It is of course possible to phosphorylate to lower phosphorus contents, even approaching zero by this process or to go as high as 20% or more phosphorus depending on the time of phosphorylation, the copolymer used and amounts of reactants and catalysts, if employed. However, when the polymer contains at least about 0.5% phosphorus and up to about 5%, the polymers can be effectively vulcanized or cross-linked with heavy metal oxides to yield useful elastomers having brittle temperatures of −60° C. to 70° C. or lower and with good high temperature properties such as elongation at break and tensile strength. In preparing the vulcanizates these copolymeric products having phosphoryl dichloride groups can be hydrolyzed with water or esterified with alcohols to the corresponding phosphonic acid groups or phosphonyl ester group and the heavy metal oxide, preferably lead oxide (litharge) added with or without accelerators such as hydrogenated resin, and cured under heat and pressure.

The hydrolysis or esterification of such products can readily be accomplished by admixing the phosphorylated copolymer with water or an aliphatic alcohol, without need of heat or catalyst. The hydrolyzed product exhibits ion exchange capacity and can be used as such without further treatment. Without hydrolysis or esterification, the phosphorylated copolymer can be cross-linked with organic diamines, preferably the aliphatic diamines.

The following examples are merely illustrative of this invention and should not be construed as a limitation thereof.

EXAMPLE I (a) *Preparation of copolymer.*—An equimolar mixture of ethylene and propylene was passed into a suspension of 60 millimoles of $AlR_3$ and 20 millimoles of $TiCl_3$ in 3 liters of chlorobenzene during a period of 171 minutes, during which time the temperature of the reaction mix increased from 23° C. to 59° C. Yield of copolymer was 208 g.

(b) *Phosphorylation of copolymer.*—8 ml. of water was added to the copolymer solution of (a) and oxygen passed into the solution at the rate of 470 ml./min. for five minutes at a temperature of 40° C. after which 121 g. phosphorus trichloride was added. Oxygen was then passed into the solution at a rate of 850 ml./minute for twelve minutes at a temperature of 35° C. to 54° C. The solution was again flushed with nitrogen and the phosphorlyated copolymer precipitated by pouring the chlorobenzene solution into 6 liters of isopropanol. The precipitate was filtered off, washed with isopropanol, and dried, at 25° C. for ten hours. Yield of phosphorylated copolymer 211 g. Phosphorus content as diisopropyl ester of phosphonic acid groups was 0.97% by weight, as determined by elemental analysis.

As a showing of utility, the copolymer was vulcanized in the following manner.

(c) *Vulcanization of the phosphorylated copolymer.*— One hundred grams of the product from (b) was compounded on a cold rubber mill with 40 grams of lead oxide, 3 grams of 2-mercaptobenzothiazole and 2.6 grams of hydrogenated rosin. The resulting composition was vulcanized by heating between steel plates for 30 minutes at 155° C., and a pressure of 2000 p.s.i. The tensile strength of the vulcanizate was 1330 p.s.i. and the ultimate elongation was 540%.

The appended table lists the details of other experiments, all being conducted in substantially the same manner as Example I using equimolar ratios of ethylene and propylene.

*Copolymerization of Ethylene and Propylene as in Example 1a*

| Example | Chlorobenzene (cc.) | $AlR_3/TiCl_3$, millimoles/l. diluent (3 to 1) | Poly. Time (min.) | Copoly. Yield (g.) |
|---|---|---|---|---|
| 2 | 3,000 | 20 | 185 | 202 |
| 3 | 3,000 | 20 | 177 | 208 |
| 4 | 3,000 | 20 | 171 | 202 |
| 5 | 3,000 | 20 | 190 | 220 |
| 6 | 3,000 | 20 | 163 | 200 |
| 7 | 750 | 20 | 66 | 45 |

*Phosphorylation of Copolymer as in Example 1b*

| Example | $H_2O$ (cc.) | $PCl_3$ (cc.) | $PCl_3$/Copoly. (by wt.) | Mole ratio, $O_2/PCl_3$ | Yield Phos. Copoly., gms. | Weight |
|---|---|---|---|---|---|---|
| 2 | 8 | 80 | 0.62:1 | 0.40:1 | 205 | 0.35 |
| 3 | 8 | 80 | 0.61 | 0.38:1 | 216 | 0.79 |
| 4 | 8 | 80 | 0.62 | 0.50:1 | 211 | 0.97 |
| 5 | 8 | 100 | 0.71 | 0.46:1 | 230 | 1.02 |
| 6 | 8 | 80 | 0.73 | 0.65:1 | 210 | 1.27 |
| 7 | 2 | 50 | 1.78 | 0.52:1 | 50 | 1.77 |

*Vulcanizate Properties as in Example 1c*

| Example | Tensile Strength (p.s.i.) | Ultimate Elongation (percent) |
|---|---|---|
| 2 | 1,520 | 1,350 |
| 3 | 1,490 | 1,000 |
| 4 | 1,330 | 540 |
| 5 | 1,260 | 400 |
| 6 | 1,140 | 260 |
| 7 | 730 | 140 |

We claim:

1. A process for preparing elastomeric phosphorylated ethylene-propylene copolymers containing between about 35 percent to 80 percent propylene polymerized therein and being substantially free of low molecular weight polymeric oils, which includes the steps of copolymerizing ethylene and propylene monomers in a molar ratio of from about 0.5 mole to about 5.0 moles of propylene per mole of ethylene by contacting said monomers with a catalyst system consisting essentially of a trialkyl aluminum compound and a transition metal trihalide selected from the group of vanadium trichloride and purple crystalline titanium trichloride in which the said trialkyl aluminum compound is present in amounts from about 1 to 10 moles per mole of said transition metal trihalide, in an inert non-polar solvent for a time sufficient to form an ethylene-propylene copolymer, thereafter adding to the resulting mixture, oxygen and water in amounts sufficient to convert the aluminum and transition metal to the corresponding metal oxide, said water being employed in at least a stoichiometric amount and no greater than about 5 times the stoichiometric amount calculated to convert all hydrolyzable components of said catalyst system to the metal oxide, and thereafter phosphorylating the mixture by adding phosphorus trichloride to the mixture and contacting oxygen with the thus formed mixture until the copolymer contains more than about 0.5 percent phosphorus as phosphonyl dichloride groups.

2. The process as described in claim 1 wherein the copolymerization is conducted at a temperature between about 20° C. and 120° C. and the phosphorylation is conducted at a temperature between about 20° C. and 75° C.

3. The process as described in claim 1 wherein the ethylene and propylene are employed in about equimolar amounts.

4. The process as described in claim 1 wherein the trialkyl aluminum is triisobutyl aluminum.

5. The process as described in claim 1 wherein the inert non-polar solvent has a boiling point of greater than 110° C.

6. The process as described in claim 1 wherein the transition metal halide is vanadium trichloride.

7. The process as described in claim 1 wherein the transition metal halide is purple crystalline titanium trichloride.

References Cited in the file of this patent

UNITED STATES PATENTS

| 2,886,561 | Reynolds et al. | May 12, 1959 |
| 2,893,984 | Seelbach et al. | July 7, 1959 |
| 2,918,461 | Flynn | Dec. 22, 1959 |
| 3,008,939 | Schroeder et al. | Nov. 14, 1961 |

FOREIGN PATENTS

| 1,218,659 | France | Dec. 21, 1959 |

OTHER REFERENCES

"Organo-Phosphorus Compounds" (Kosolapoff), 1950, pages 66 and 67.

Clayton et al.: J.A.C.S., vol. 70 (1948), pages 3880–3882.

UNITED STATES PATENT OFFICE
CERTIFICATE OF CORRECTION

Patent No. 3,097,194　　　　　　　　　　　　　　　　July 9, 1963

Edward C. Leonard, Jr., et al.

It is hereby certified that error appears in the above numbered patent requiring correction and that the said Letters Patent should read as corrected below.

Column 1, line 15, for "or" read -- of --; column 6, Example 1b, fourth column, line 5 thereof, for "0.73" read -- 0.63 --; same column 6, line 51, for "whrich" read -- which --.

Signed and sealed this 14th day of January 1964.

(SEAL)
Attest:
ERNEST W. SWIDER

Attesting Officer

EDWIN L. REYNOLDS

Acting Commissioner of Patents